(12) United States Patent
Guo et al.

(10) Patent No.: US 11,314,694 B2
(45) Date of Patent: Apr. 26, 2022

(54) FACILITATING ACCESS TO DATA IN DISTRIBUTED STORAGE SYSTEM

(71) Applicant: EMC IP Holding Company, LLC, Hopkinton, MA (US)

(72) Inventors: Feng Guo, Shanghai (CN); Tianqing Wang, Shanghai (CN); Kai Yan, Shanghai (CN); Qiyan Chen, Shanghai (CN); Yun Zhang, Shanghai (CN); Yicang Wu, Shanghai (CN); Lin Peng, Shanghai (CN); Zhihao Lu, Shanghai (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 1115 days.

(21) Appl. No.: 14/577,045

(22) Filed: Dec. 19, 2014

(65) Prior Publication Data
US 2015/0186520 A1  Jul. 2, 2015

(30) Foreign Application Priority Data
Dec. 31, 2013 (CN) .......................... 2013 1 0756039

(51) Int. Cl.
*G06F 16/30* (2019.01)
*G06F 16/174* (2019.01)

(52) U.S. Cl.
CPC ................. *G06F 16/1748* (2019.01)

(58) Field of Classification Search
None
See application file for complete search history.

(56) References Cited

U.S. PATENT DOCUMENTS

| | | | |
|---|---|---|---|
| 2002/0138559 A1* | 9/2002 | Ulrich | G06F 16/10 709/203 |
| 2003/0005152 A1* | 1/2003 | Diwan | H04L 29/12113 709/239 |
| 2004/0117358 A1* | 6/2004 | von Kaenel | G06Q 40/08 |
| 2009/0055268 A1* | 2/2009 | Knoller | G06Q 30/02 705/14.61 |
| 2015/0052214 A1* | 2/2015 | Zhao | H04L 67/1008 709/211 |
| 2015/0169306 A1* | 6/2015 | Labocki | G06F 8/60 717/176 |

* cited by examiner

*Primary Examiner* — Anhtai V Tran
(74) *Attorney, Agent, or Firm* — Brian J. Colandreo; Mark H. Whittenberger; Holland & Knight LLP

(57) ABSTRACT

Embodiments of the present disclosure relate to an apparatus and method for facilitating access to data in a distributed storage system by using a processing unit configured to collect information related to running status of the distributed storage system; obtain metadata related to data stored in the distributed storage system; in response to a request from a client, provide to the client the information related to running status and metadata related to data to be accessed; and extend storage nodes in the distributed storage system so that the client can directly access the storage nodes by using the information related to running status and the metadata related to data to be accessed. Other embodiments are also disclosed.

19 Claims, 5 Drawing Sheets

FACILITATING ACCESS TO DATA IN DISTRIBUTED STORAGE SYSTEM

RELATED APPLICATION

This application claims priority from Chinese Patent Application Number CN201310756039.1 filed on Dec. 31, 2013 entitled "APPARATUS AND METHOD FOR FACILITATING ACCESS TO DATA IN DISTRIBUTED STORAGE SYSTEMS" the content and teachings of which is herein incorporated by reference in its entirety.

FIELD OF THE INVENTION

Embodiments of the present disclosure generally relate to the field of data processing, and more particularly, for facilitating access to data in a distributed storage system.

BACKGROUND OF THE INVENTION

Distributed storage architecture has been widely used in the field of storage infrastructure design in recent years for achieving scalability, big volume of data, high availability and etc. Some distributed storage systems segment large volume of data (typically in the range of gigabytes to terabytes) into multiple partitions and store partitions across multiple storage nodes of the distributed storage systems, either based on commercial machines or enterprise hardware. In order to achieve reliability, these distributed storage systems usually replicate each partition of data so as to generate one or more duplication of the partition and store the one or more duplication across one or more storage nodes.

Partition information of data and storage location information of each partition and its duplication is transparent to a client requesting to access the data. In other words, the client does not know the number of partitions that the data is segmented into, and which storage node each partition is stored on. Take a cluster storage system of Isilon® available from EMC as an example, wherein any node in Isilon may act as an access node. When a client sends a request to an access node for accessing data stored in Isilon, since data partitions are stored across multiple nodes in the system, it is the access node's responsibility to fetch file partitions from nodes storing the data partitions, assemble the data from partitions and provide the assembled partitions (data) to the client. Clearly, this inevitably demands high resource consuming on the access node and brings significant bandwidth overhead to the Isilon cluster storage system.

SUMMARY OF THE INVENTION

If the client can obtain partition information and distribution information of partitions and their duplication in the storage system, then the client can fetch partitions from storage nodes and assemble them by itself, thereby reducing some load on the storage system. To alleviate the above-described problems, the present disclosure provides an apparatus and method for facilitating access to data in a distributed storage system, and a corresponding method and apparatus for accessing data in a distributed storage system.

According to an embodiment of the present disclosure, there is provided an apparatus for facilitating access to data in a distributed storage system. The apparatus includes a processing unit configured to collect information related to running status of the distributed storage system; to obtain metadata related to data stored in the distributed storage system; in response to a request from a client, provide to the client the information related to running status and metadata related to data to be accessed; and to extend storage nodes in the distributed storage system so that the client can directly access the storage nodes by using the information related to running status and the metadata related to data to be accessed.

In one exemplary embodiment, the processing unit may further be configured to, in response to the request from the client, send a first query request to the collecting unit for obtaining the information related to running status and send a second query request for obtaining the metadata.

In one exemplary embodiment, the processing unit may further be configured to, in response to the first query request, collect the information related to running status from the distributed storage system; and, in response to the second query request, obtain the metadata from the distributed storage system.

In one exemplary embodiment, the processing unit may further be configured to periodically obtain the metadata from the distributed storage system.

In one exemplary embodiment, the processing unit may further be configured to receive a notification indicating storage status of the data changes, and obtain the metadata from the distributed storage system in response to the notification.

In one exemplary embodiment, the processing unit is further configured to monitor a message bus so as to obtain information related to change in storage status of the data, the information comprising the metadata.

In one exemplary embodiment, the apparatus may further comprise: an information repository configured to store the information related to running status collected by the collecting unit and the metadata obtained by the metadata obtaining unit.

In one exemplary embodiment, the processing unit may be further configured to, in response to the request from the client, query the information repository for obtaining the information related to running status and the metadata.

According to a further embodiment of the present disclosure, there is provided an apparatus for accessing data in a distributed storage system. The apparatus comprises: a processing unit configured to send a request for obtaining information related to running status of the distributed storage system and metadata related to data to be accessed; to receive a response to the request, the response containing the information related to running status and the metadata; and to directly access storage nodes in the distributed storage system by using the information related to running status and the metadata.

According to a further embodiment of the present disclosure, there is provided a method for facilitating access to data in a distributed storage system. The method includes collecting information related to running status of the distributed storage system; obtaining metadata related to data stored in the distributed storage system; in response to a request from a client, providing to the client the information related to running status and metadata related to data to be accessed; and extending storage nodes in the distributed storage system so that the client can directly access the storage nodes by using the information related to running status and the metadata related to data to be accessed.

According yet a further embodiment of the present disclosure, there is provided a method for accessing data in a distributed storage system. The method includes sending a request for obtaining information related to running status of the distributed storage system and metadata related to data to be accessed; receiving a response to the request, the response containing the information related to running status and the metadata; and directly accessing storage nodes in the distributed storage system by using the information related to running status and the metadata.

As appreciated from detailed description below, with the embodiments of the present disclosure, by providing to clients information related to running status of a distributed storage system and metadata related to data stored in the distributed storage system, the clients that have considerable capability of computation, storage and networking and can embed complex intelligence (hereinafter referred to as "intelligent clients") are able to decide on their own about a proper way to access data for obtaining optimal access performance or achieving best application objectives, e g minimizing data backup window. In addition, based on the information related to running status of the distributed storage system and metadata related to data to be accessed, clients can directly access storage nodes storing data, obtain partitions (or their copies) of data to be accessed from corresponding storage nodes and assemble partitions locally on clients, while access nodes in the distributed storage system do not have to assemble partitions, thereby preventing the access nodes from becoming bottleneck and helping to share load of the distributed storage system.

BRIEF DESCRIPTION OF THE DRAWINGS

Through the detailed description of some embodiments of the present disclosure in the accompanying drawings, the features, advantages and other aspects of the present disclosure will become more apparent, wherein several embodiments of the present disclosure are shown for the illustration purpose only, rather than for limiting. In the accompanying drawings.

Throughout the figures, the same or corresponding numerals refer to the same or corresponding parts.

DETAILED DESCRIPTION

Figure 1:
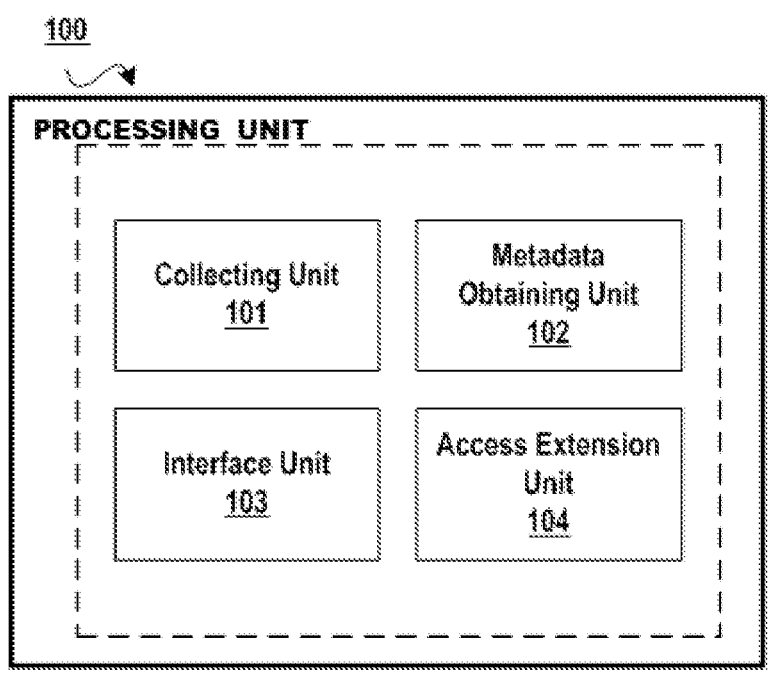
FIG. 1 illustrates an exemplary block diagram of an apparatus 100 for facilitating access to data in a distributed storage system according to one embodiment of the present disclosure.

Hereinafter, principles and spirit of the present disclosure will be described with reference to several exemplary embodiments shown in the drawings various. It should be understood that provision of these embodiments is only to enable those skilled in the art to better understand and further implement the present invention but not to limit the scope of the present invention in any manner.

With reference to FIG. 1, which illustrates an exemplary block diagram of an apparatus 100 for facilitating access to data in a distributed storage system according to one embodiment of the present disclosure. Apparatus 100 may be implemented as one part of an existing distributed storage system or an apparatus external to an existing distributed storage system and capable of communicating with the distributed storage system.

As shown in FIG. 1, apparatus 100 comprises processing unit that in turn can comprise a number of units detailed below, or in one embodiment can be a single unit configured to perform the tasks of each of the separate units detailed below in FIG. 1 and FIG. 2. Disclosed below is the apparatus with each unit separately listed, but it should be obvious to one skilled in the art that all these separate units may be combined into a single processing unit, which can perform the tasks of each of the separate units. A single processing unit would be advantageous in a sense that it would reduce overhead costs and processing would be much faster that processing data in separated units.

The apparatus 200 includes a collecting unit 101, a metadata obtaining unit 102, an interface unit 103 and an access extension unit 104. Collecting unit 101 is configured to collect information related to running (hereinafter also referred to as active) status of the distributed storage system. The information related to active status of the distributed storage system may include status information of the distributed storage system at a certain point in time and statistical status information of the distributed storage system in a given time period. The status information of the distributed storage system at a certain point in time includes but is not limited to: storage node load at a certain time point (e.g., CPU usage, memory utility, network speed, response time), storage node performance, node health status, etc. The statistical status information of the distributed storage system in a given time period includes, for example, average response time of storage nodes in past several minutes. Consider collecting status information of the distributed storage system at a certain time point as an example, which may include collecting a real-time matrix from the distributed storage system, and generating, based on the real-time matrix, a status overall view of the whole distributed storage system and detailed status for each storage node at a certain time point. In addition, the statistical status information of the distributed storage system in a given time period may be further generated based on the collected real-time matrix. It may be understood that the real-time matrix is used for representing a series of values of each node in the distributed storage system from different dimensional perspectives. The generation, based on the real-time matrix, of a status overall view of the whole distributed storage system and detailed status for each storage node at a certain time point may be implemented in a manner known to those skilled in the art and thus is not described in detail herein. Likewise, generating statistical status information of the distributed storage system in a given time period may also be implemented in a manner known to those skilled in the art and thus is not described in detail herein.

Metadata obtaining unit 102 is configured to obtain metadata related to data stored in the distributed storage system. The term "metadata" as used herein refers to data for describing information of stored data. As an example, the metadata may include but is not limited to storage location information of the stored data, duplication policy of the stored data, partition rule of the stored data, etc. More specifically, the storage location information of the stored data may indicate on which storage nodes a data partition and its duplication are stored.

It may be understood that where metadata obtaining unit 102 obtains metadata related to data stored in the distributed storage system depends on an architecture associated with the distributed storage system. For example, where the distributed storage system has a master node, since the master node maintains metadata related to all the stored data, metadata obtaining unit 102 may obtain the metadata from the master node.

In one embodiment, metadata obtaining unit 102 is configured to periodically obtain the metadata from the distributed storage system. For example, metadata obtaining unit 102 may obtain the metadata from the distributed storage system at predetermined intervals (e.g., every 5 seconds). In another embodiment, metadata obtaining unit 102 may be configured to receive a notification indicating storage status of data changes, and to obtain metadata from the distributed storage system in response to the notification. Therefore, by obtaining metadata from the distributed storage system in response to the notification, it can be better ensured that metadata in apparatus 100 synchronizes and coincides with metadata in the distributed storage system.

Interface unit 103 is configured to, in response to a request from a client, to provide the client with information related to active status and metadata related to data to be accessed.

In one embodiment, interface unit 103 is further configured to, in response to a request from a client, send a first query request to collecting unit 101 for obtaining the information related to active status of the distributed storage system and send a second query request to metadata obtaining unit 102 for obtaining metadata related to data to be accessed by the client. In response to the first query request, collecting unit 101 collects the information related to active status from the distributed storage system; and in response to the second query request, metadata obtaining unit 102 obtains the metadata from the distributed storage system. In this embodiment, since interface unit 103 sends query requests respectively to collecting unit 101 and metadata obtaining unit 102 in response to the request from the client, and collecting unit 101 and metadata obtaining unit 102 obtain the information related to running status and the metadata respectively in response to the query requests. Thus, the real time performance and consistency of the information related to active status and the metadata can be ensured better.

Access extension unit 104 is configured to extend storage nodes in the distributed storage system so that the client can directly access the storage nodes by using the information related to active status and the metadata related to data to be accessed. Usually, existing storage interfaces can only receive access inside the distributed storage system, and therefore access extension unit 104 has to complete data access relaying such that the client outside the storage system can directly access the storage nodes via access extension unit 104. Access extension unit 104 even can be installed on each storage node, and can utilize existing functions of the storage nodes or be implemented as a new function in the storage nodes.

According to some embodiments of the present disclosure, apparatus 100 further comprises an information repository (not shown in the Figures), the information repository being configured to store the information related to active status collected by collecting unit 101 and the metadata obtained by metadata obtaining unit 102. Interface unit 103 is further configured to, in response to the request from a client, query the information repository to obtain the information related to active status and the metadata. The information repository may be implemented using any appropriate technique that is currently known or to be developed in future as designed by embodiments of the present disclosure. For example, the information repository may be implemented as a database, such as a relational database or other types of database. Alternatively, other embodiments of the information repository are also possible. The scope of the present disclosure is not limited in this regard.

It should be understood that apparatus 100 described with reference to FIG. 1 may be implemented in various different manners. For example, in some embodiments, apparatus 100 may be implemented using software and/or firmware. Alternatively or additionally, apparatus 100 may be implemented partially or completely based on hardware. For example, apparatus 100 may be implemented as an integrated circuit (IC) chip or an application specific integrated circuit (ASIC). Apparatus 100 may also be implemented as a system on chip (SOC). Other manners that are currently known or developed in the future are also possible, and the scope of the present invention is not limited thereto.

Figure 2:
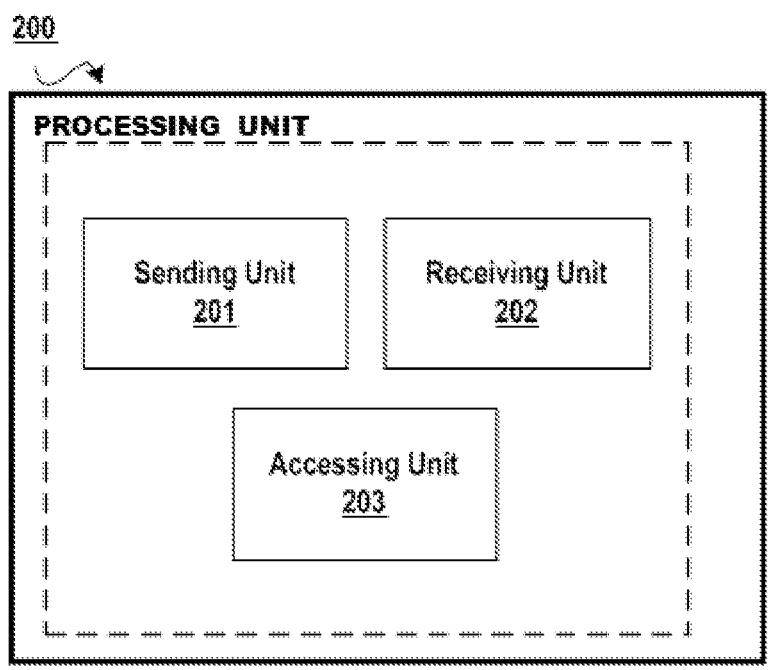
FIG. 2 illustrates an exemplary block diagram of an apparatus 200 for accessing data in a distributed storage system according to one embodiment of the present disclosure.

Reference is now made to FIG. 2, which shows a block diagram of an apparatus 200 for accessing data in a distributed storage system according to one embodiment of the present disclosure. As disclosed previously each unit has been separately listed, but it should be obvious to one skilled in the art that all these separate units may be combined into a single processing unit, which can perform the tasks of each of the separate units. A single processing units would be advantageous in a sense that it would reduce overhead costs and processing would be much faster that processing data in separated units Accordingly in some embodiments, apparatus 200 may be used in combination with apparatus 100 described above with reference to FIG. 1, and may in one embodiment be part of apparatus 100 of FIG. 1.

As illustrated in FIG. 2, apparatus 200 comprises a sending unit 201, a receiving unit 202 and an accessing unit 203 (which can all be part of the processing unit.)

Sending unit 201 is configured to send a request for obtaining information related to an active status of the distributed storage system and metadata related to data that needs to be accessed. When apparatus 200 is used in combination with apparatus 100 shown in FIG. 1, sending unit 201 may, for example, send to interface unit 103 of apparatus 100 the request for obtaining the information related to an active status and the metadata. According to one embodiment, the request may comprise an identifier of the data to be accessed, such as a filename or other identifier of a file to be accessed.

Receiving unit 202 is configured to receive a response to the request, the response containing the information related to the active status and the metadata. Where apparatus 200 is used in combination with apparatus 100 shown in FIG. 1, receiving unit 202 may receive the response from interface unit 103 of apparatus 100 for example.

Accessing unit 203 is configured to use the information related to the active status and the metadata to directly access storage nodes in the distributed storage system, so as to access data stored on the storage nodes.

By using the information obtained that is related to the active status of the distributed storage system and metadata related to data to be accessed, accessing unit 203 may decide, on its own, an appropriate approach for accessing data so as to achieve an optimum application object.

Specifically, as described above, the metadata related to data to be accessed includes, for example, storage location information of the data to be accessed, duplication policy of stored data, partition rule of stored data, etc. Based on the metadata related for the data to be accessed, it is possible to learn about the number of partitions the data, to be accessed, is segmented into, the number of duplications each partition has, and on which storage node each partition and its duplication are stored. As described above, the information related to the active status of the distributed storage system includes for example, storage node load (e.g., CPU usage, memory utility, network speed, response time), storage node performance, node health status at a certain time period or in a given time period, etc. Based on the information related to the active status of the distributed storage system, load situation of storage nodes where a partition exists and its duplication of the data to be accessed are stored can be learned. Therefore, based on the information related to the active status of the storage system and the metadata related to data to be accessed, accessing unit 203 can decide on its own whether to access in parallel data partitions or partition duplication on different storage nodes or intelligently access data from storage nodes that may gain best input/output (TO) performance.

Consider a data backup application client (hereinafter abbreviated as a client) as an example of apparatus 200. Detailed description of an interaction process between apparatus 200 and apparatus 100 is presented below. It is to be understood that the below description is just exemplary, interaction processes different from those mentioned above can be performed between apparatus 200 and apparatus 100 and information different from those mentioned above can be exchanged between apparatus 200 and apparatus 100.

1. Sending unit 201 of client 200 interacts with interface unit 103 of apparatus 100, for example, and sends to interface unit 103 a request for obtaining information related to an active status of the distributed storage system and metadata related to data that needs to be accessed. The request may include an identifier of the data to be accessed, such as a file name or other identifiers of a file to be accessed.

2. In response to receiving the request from client 200, interface unit 103 sends a first query request to collecting unit 101 for obtaining the information related to the active status and sends a second query request to metadata obtaining unit 102 for obtaining the metadata. The information related to the active status includes, for example, average response time and workload (e.g., CPU usage, network speed, memory utility, etc.) of each storage node in the past three minutes (or any specified time period). The metadata related to data that needs to be accessed includes, for example, storage location of each partition of the data that needs to be accessed on storage nodes and storage location of duplication of each partition on storage nodes. For example, the data to be accessed may be divided into three partitions, the three partitions may be stored in three storage nodes, and each partition may have at least one duplication.

3. In response to the first query request, collecting unit 101 collects information related to the active status from the distributed storage system and provides the collected information related to the active status to interface unit 103. In response to the second query request, metadata obtaining unit 102 obtains metadata from the distributed storage system and provides the obtained metadata to interface unit 103.

4. Interface unit 103 sends the information related to the active status and the metadata to client 200.

5. Receiving unit 202 of client 200 receives the information related to the active status and the metadata.

6. Based on the received information related to the active status and the metadata, accessing unit 203 of client 200 initiates three data access requests to storage nodes storing partitions for accessing in parallel the storage nodes storing partitions via access extension unit 104. For each partition, accessing unit 203 may intelligently select, based on status information (e.g., load situation) of storage nodes storing the partition and storage nodes storing the partition's duplication, a proper storage node from these two available storage nodes so as to achieve superlative access performance, e.g. minimizing data backup window.

Figure 3:
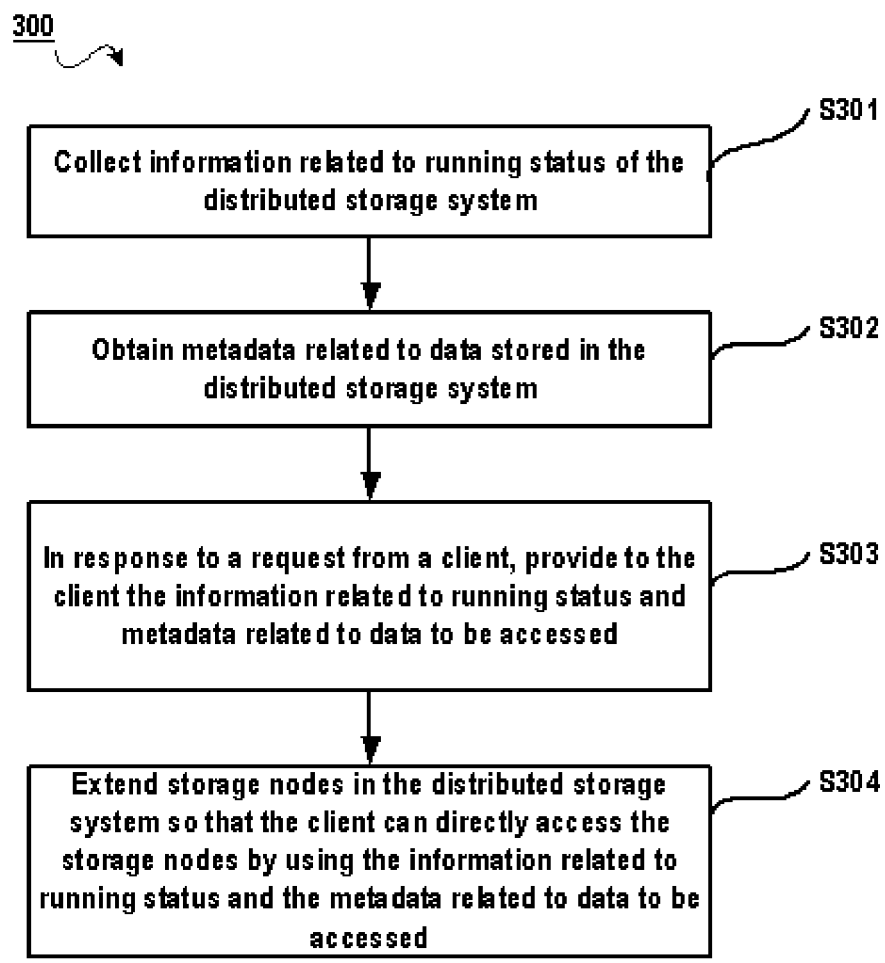
FIG. 3 illustrates an exemplary flowchart of a method 300 for facilitating access to data in a distributed storage system according to one embodiment of the present disclosure.

Reference is now made to FIG. 3, which illustrates a flowchart of a method 300 for facilitating access to data in a distributed storage system according to one embodiment of the present disclosure. It should be understood steps shown in method 300 are merely illustrative in nature. For example, these steps may be executed in different order or even in parallel. In addition, method 300 may also include additional steps, replace some steps or omit some steps, and any such amendments to the method steps do not alter the scope of the embodiments of the present disclosure.

In step S301, information related to active status of the distributed storage system is collected.

In step S302, metadata related to data stored in the distributed storage system is obtained. According to one embodiment, the obtaining metadata related to data stored in the distributed storage system includes periodically obtaining the metadata from the distributed storage system. According to a further embodiment, obtaining metadata related to data stored in the distributed storage system includes receiving a notification indicating storage status of the data changes; and in response to the notification, obtaining the metadata from the distributed storage system.

In step S303, in response to a request from a client, the information related to the active status and metadata related to data that needs to be accessed are provided to the client. According to an embodiment, providing, in response to a request from a client, the information related to the active status and metadata related to data that needs to be accessed to the client includes in response to the request from the client, collecting the information related to the active status from the distributed storage system and obtaining the metadata from the distributed storage system.

In step S304, storage nodes in the distributed storage system is extended, so that the client can directly access the storage nodes by using the information related to the active status and the metadata related to data to be accessed.

According to some embodiments, method 300 further includes storing the information related to running status and the metadata in an information repository in the distributed storage system. According to an embodiments, providing, in response to a request from a client, the information related to the active status and metadata related to data that needs to be accessed to the client includes in response to the request from the client, sending a query request to the information repository for obtaining the information related to the active status and the metadata; and providing to the client the information related to the active status and the metadata obtained from the information repository.

It should be understood that method 300 described with reference to FIG. 3 may be executed by apparatus 100 described with reference to FIG. 1 and/or by apparatus 200 described with reference to FIG. 2. In particular, various steps in method 300 may be executed by corresponding units in apparatus 100 or in the processing unit, which combines all the units into a single unit. Therefore, various features as above described with reference to apparatus 100 are likewise suitable for steps in method 300, which will not be detailed here.

Figure 4:
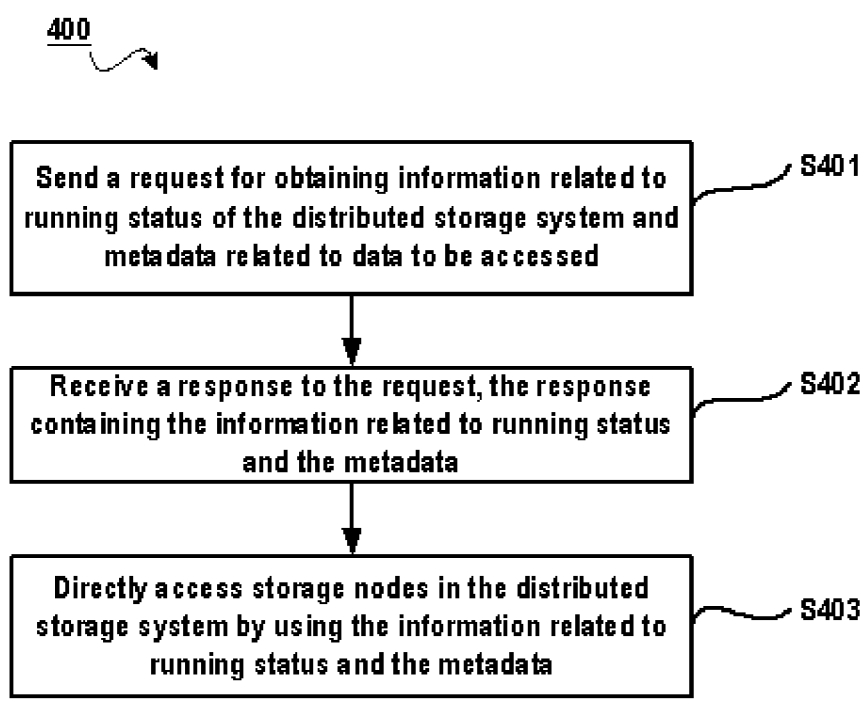
FIG. 4 illustrates an exemplary flowchart of a method 400 for accessing data in a distributed storage system according to one embodiment of the present disclosure.

Reference is now made to FIG. 4 below, which illustrates an exemplary flowchart of a method 400 for accessing data in a distributed storage system according to an embodiment of the present disclosure.

In step S401, a request is sent for obtaining information related to the active status of the distributed storage system and metadata related to data that needs to be accessed;

In step S402, a response to the request is received, the response containing the information related to the active status and the metadata.

In step S403, storage nodes in the distributed storage system is directly accessed using the information related to the active status and the metadata.

It should be understood that method 400 described with reference to FIG. 4 may be executed by apparatus 200 described with reference to FIG. 2 or in one embodiment can be implemented in the processing unit, which combines all units for FIG. 2 into a single unit. In particular, various steps in method 400 may be executed by corresponding units in apparatus 200. Therefore, various features as above described with reference to apparatus 200 are likewise suitable for steps in method 400, which will not be detailed here.

Figure 5:
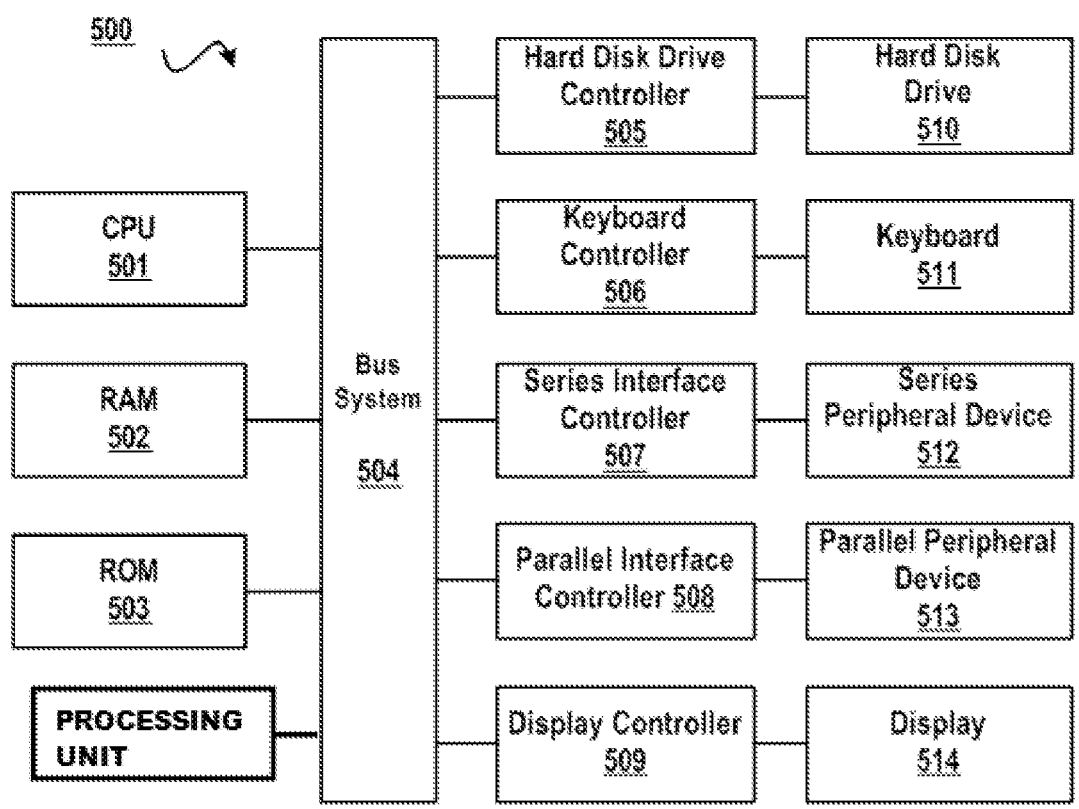
FIG. 5 illustrates an exemplary block diagram of a computer system 500 which is applicable to implement the embodiments of the present disclosure.

Reference is now made to FIG. 5 shows a schematic block diagram of a computer system 500 that is applicable to implement the embodiments of the present disclosure. For example, computer system 500 shown in FIG. 5 may be used for implementing above-described apparatus 100 for facilitating access to data in a distributed storage system and apparatus 200 for accessing data in a distributed storage system.

As illustrated in FIG. 5, the exemplary computer system may include: a CPU (Central Processing Unit) 501, a RAM (Random Access Memory) 502, a ROM (Read Only Memory) 503, a system bus 504, a hard disk controller 505, a keyboard controller 506, a serial interface controller 507, a parallel interface controller 508, a monitor controller 509, a hard disk 510, a keyboard 511, a serial peripheral device 512, a parallel peripheral device 513 and a monitor 514. Among these devices, connected to the system bus 504 are the CPU 501, the RAM 502, the ROM 503, the hard disk controller 4505, the keyboard controller 506, the serial interface controller 507, the parallel interface controller 508 and the monitor controller 509. The hard disk 510 is coupled to the hard disk controller 505; the keyboard 511 is coupled to the keyboard controller 506; the serial peripheral device 512 is coupled to the serial interface controller 507; and the parallel peripheral device 513 is coupled to the parallel interface controller 508; and the monitor 514 is coupled to the monitor controller 509. In addition to the components described below of the computer system 500, computer system 500 further includes the processing units as disclosed in FIG. 1 and FIG. 2, and can advantageously implement the method that has been detailed in FIG. 3 and FIG. 4. It should be understood that the structural block diagram in FIG. 5 is shown only for illustration purpose, and is not intended to limit the scope of the present disclosure. In some cases, some devices may be added or reduced as required.

As above mentioned, apparatuses 100 and 200 may be implemented through pure hardware, for example, chip, ASIC, SOC, etc. Such hardware may be integrated into computer system 500. Besides, the embodiments of the present disclosure may also be implemented in a form of a computer program product. For example, method 300 as described with reference to FIG. 3 and method 400 as described with reference to FIG. 4 may be implemented via a computer program product. This computer program product may be stored in RAM 502, ROM 503, hard disk 510 and/or any suitable storage medium as illustrated in FIG. 5, or downloaded to computer system 500 from a suitable location in the network. The computer program product may comprise computer code portions comprising program instructions that may be executed through a suitable processing device (for example, CPU 501 as shown in FIG. 5). The program instruction at least may comprise instructions for implementing the steps of methods 300 and 400.

It should be noted that, the embodiments of the present disclosure can be implemented in software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory. In actuality, according to the embodiments of the present disclosure, the features and functions of two or more units above described may be embodied in one unit. On the contrary, the features and functions of one unit above described may be further partitioned to be embodied in more units.

Besides, although operations of the present methods are described in a particular order in the drawings, it does not require or imply that these operations must be performed according to this particular order, or a desired outcome can only be achieved by performing all shown operations. On the contrary, the execution order for the steps as depicted in the flowcharts may be varied. Additionally or alternatively, some steps may be omitted, a plurality of steps may be merged into one step for execution, and/or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. An apparatus for facilitating access to data in a distributed storage system, the apparatus comprising:
a processing unit configured to:
collect information related to an active status of, and a statistical value associated with, one or more performance criteria of one or more nodes within a distributed storage system, wherein the active status of the one or more nodes within the distributed storage system includes one or more of storage node load at a certain time point, storage node performance, and node health status, wherein the processing unit is further configured to collect a real-time matrix from the distributed storage system;
generate, based upon the real-time matrix, a status overall view of at least one of the distributed storage system and a detailed status for each of the one or more nodes at the certain time point;
obtain metadata related to data stored in the distributed storage system, wherein the data has been partitioned and stored in a plurality of stripes within the data storage system;
receive a request from a client for obtaining information related to the data stored in the distributed storage system, wherein in response to receiving the request from the client:
provide to the client the information related to the active status, the statistical value, and metadata related to the data stored in the distributed storage system; and
send a first query request to the processing unit to obtain the information related to the active status and send a second query request to the processing unit to obtain the metadata, wherein the metadata related to the data to be obtained comprises a storage location of each partition of the data to be obtained on the one or more nodes and a storage location of duplication of each partition of the data to be obtained on the one or more nodes; and
extend storage nodes in the distributed storage system wherein the client can directly access the storage nodes using the information related to the active status, the statistical value, and the metadata related to the data stored in the distributed storage system.

2. The apparatus according to claim 1, further configured to, in response to the first query request, collect the information related to the active status from the distributed storage system; and
in response to the second query request, obtain the metadata from the distributed storage system.

3. The apparatus according to claim 1, is further configured to periodically obtain the metadata from the distributed storage system.

4. The apparatus according to claim 1, is further configured to receive a notification indicating a storage status of data changes, and obtain the metadata from the distributed storage system in response to the notification.

5. The apparatus according to claim 1, is further configured to monitor a message bus to obtain information related to change in a storage status of the data, the information comprising the metadata.

6. The apparatus according claim 1, further comprises:
an information repository configured to store the information related to the active status and the metadata obtained by the metadata obtaining unit.

7. The apparatus according to claim 6, wherein the processing unit is further configured to, in response to the request from the client, query the information repository to obtain the information related to the active status and the metadata.

8. The apparatus according to claim 1, further configured to:
send a request to obtain information related to the active status of the distributed storage system and the metadata related to the data stored in the distributed storage system;
receive a response to the request, the response containing the information related to the active status and the metadata; and
directly access the storage nodes in the distributed storage system using the information related to the active status and the metadata.

9. A method for facilitating access to data in a distributed storage system, the method comprising:
collecting information related to an active status of, and a statistical value associated with, one or more performance criteria of one or more nodes within a distributed storage system, wherein the active status of the one or more nodes within the distributed storage system includes one or more of storage node load at a certain time point, storage node performance, and node health status, wherein collecting information related to an actual status includes collecting a real-time matrix from the distributed storage system;
generating, based upon the real-time matrix, a status overall view of at least one of the distributed storage system and a detailed status for each of the one or more nodes at the certain time point;
obtaining metadata related to data stored in the distributed storage system, wherein the data has been partitioned and stored in a plurality of stripes within the data storage system;
receiving a request from a client for obtaining information related to the data stored in the distributed storage system, wherein in response to receiving the request from the client:
providing to the client the information related to the active status and the metadata related to the data stored in the distributed storage system; and
sending a first query request to the processing unit to obtain the information related to the active status and sending a second query request to the processing unit to obtain the metadata, wherein the metadata related to the data to be obtained comprises a storage location of each partition of the data to be obtained on the one or more nodes and a storage location of duplication of each partition of the data to be obtained on the one or more nodes; and
extending storage nodes in the distributed storage system so that the client can directly access the storage nodes using the information related to the active status and the metadata related to the data stored in the distributed storage system.

10. The method according to claim 9, further comprises in response to the request from the client, collecting the information related to the active status from the distributed storage system and obtaining the metadata from the distributed storage system.

11. The method according to claim 9, further comprises: periodically obtaining the metadata from the distributed storage system.

12. The method according to claim 9, further comprises:
receiving a notification indicating a storage status of data changes; and obtaining the metadata from the distributed storage system in response to the notification.

13. The method according to claim 9, further comprises:
monitoring a message bus to obtain information related to change in a storage status of the data, the information comprising the metadata.

14. The method according to claim 9, further comprising:
storing the information related to the active status and the metadata in an information repository in the distributed storage system.

15. The method according to claim 14, further comprises:
in response to a request from the client, sending a query request to the information repository to obtain the information related to the active status and the metadata; and
providing to the client the information related to the active status and the metadata obtained from the information repository.

16. The method according to claim 9, further comprising:
sending a request to obtain the information related to the status of the distributed storage system and the metadata related to the data stored in the distributed storage system;
receiving a response to the request, the response containing the information related to the active status and the metadata; and
directly accessing the storage nodes in the distributed storage system by using the information related to the active status and the metadata.

17. A computer program product for facilitating access to data in a distributed storage system, the computer program product being tangibly stored in a non-transient computer readable medium and including machine executable instructions, the machine executable instructions, when being executed, causing a machine to execute:
collecting information related to an active status of, and a statistical value associated with, one or more performance criteria of one or more nodes within a distributed storage system, wherein the active status of the one or more nodes within the distributed storage system includes one or more of storage node load at a certain time point, storage node performance, and node health status, wherein collecting information related to an actual status includes collecting a real-time matrix from the distributed storage system;
generating, based upon the real-time matrix, a status overall view of at least one of the distributed storage system and a detailed status for each of the one or more nodes at the certain time point;
obtaining metadata related to data stored in the distributed storage system, wherein the data has been partitioned and stored in a plurality of stripes within the data storage system, by receiving a notification indicating a storage status of data changes, and obtaining the metadata from the distributed storage system in response to the notification, and monitoring a message bus to obtain information related to change in the storage status of the data, the information comprising the metadata;
receiving a request from a client for obtaining information related to the data stored in the distributed storage system, wherein in response to receiving the request from the client:
providing to the client the information related to the active status, the statistical value, and the metadata related to the data stored in the distributed storage system;
sending a first query request to the processing unit to obtain the information related to the active status and sending a second query request to the processing unit to obtain the metadata, wherein the metadata related to the data to be obtained comprises a storage location of each partition of the data to be obtained on the one or more nodes and a storage location of duplication of each partition of the data to be obtained on the one or more nodes; and
collecting the information related to the active status from the distributed storage system and obtaining the metadata from the distributed storage system; and
extending storage nodes in the distributed storage system so that the client can directly access the storage nodes using the information related to the active status, the statistical value, and the metadata related to the data stored in the distributed storage system.

18. The computer program product according to claim 17, further comprising:
storing the information related to the active status and the metadata in an information repository in the distributed storage system, and
in response to a request from the client, sending a query request to the information repository to obtain the information related to the active status and the metadata; and
providing to the client the information related to the active status and the metadata obtained from the information repository.

19. The computer program product according to claim 17, further comprising:
sending a request to obtain the information related to the status of the distributed storage system and the metadata related to the data related stored in the distributed storage system;
receiving a response to the request, the response containing the information related to the active status and the metadata; and
directly accessing the storage nodes in the distributed storage system by using the information related to the active status and the metadata.

* * * * *